(12) United States Patent
Won et al.

(10) Patent No.: US 8,248,557 B2
(45) Date of Patent: Aug. 21, 2012

(54) DISPLAY APPARATUS

(75) Inventors: Joo-yeon Won, Seoul (KR); Sang-duk Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 1375 days.

(21) Appl. No.: 11/704,018

(22) Filed: Feb. 7, 2007

(65) Prior Publication Data
US 2007/0195221 A1  Aug. 23, 2007

(30) Foreign Application Priority Data
Feb. 7, 2006  (KR) .................. 10-2006-0011573

(51) Int. Cl.
*G02F 1/1335* (2006.01)
*G02F 1/1333* (2006.01)
(52) U.S. Cl. ............................. 349/65; 349/58
(58) Field of Classification Search .............. 349/58–65, 349/149–152
See application file for complete search history.

(56) References Cited

U.S. PATENT DOCUMENTS

| | | | |
|---|---|---|---|
| 2004/0252254 A1* | 12/2004 | Koo et al. | 349/58 |
| 2005/0088586 A1* | 4/2005 | Mori et al. | 349/62 |

* cited by examiner

*Primary Examiner* — Richard Kim
*Assistant Examiner* — David Chung
(74) *Attorney, Agent, or Firm* — Innovation Counsel LLP

(57) ABSTRACT

A display apparatus with a light-weight power providing unit that can be easily incorporated within an acceptable fastening-error range is disclosed. The display apparatus includes a display panel that displays an image, a backlight assembly that provides the display panel with light, a rear cover that is coupled to the backlight assembly and has a guide unit formed thereon, wherein the guide unit protrudes from a bottom surface of the rear cover by a predetermined height, and a top-receiving container that has an inner space to receive the display panel and the backlight assembly and that is combined with the rear cover. There is also a power providing unit that provides the backlight assembly with driving power. The power providing unit is coupled to the rear cover at a position guided by the guide unit.

18 Claims, 5 Drawing Sheets

DISPLAY APPARATUS

CROSS REFERENCE TO RELATED APPLICATION

This application claims priority from Korean Patent Application No. 10-2006-0011573 filed on Feb. 7, 2006 in the Korean Intellectual Property Office, the content of which is incorporated herein by reference in its entirety.

BACKGROUND OF THE INVENTION

1. Field of the Invention

The present invention relates generally to a display apparatus, and more particularly to a display apparatus with a light-weight power providing unit that can be easily assembled within an acceptable fastening-error range.

2. Description of the Related Art

Currently, much attention is paid to liquid crystal displays.

Typically, a liquid crystal display (LCD) includes a liquid crystal panel, a backlight assembly providing the liquid crystal panel with light, top and bottom-receiving containers receiving the liquid crystal panel and the backlight assembly, and a power providing unit supplying the backlight assembly with driving power.

The power providing unit includes an inverter printed circuit board (PCB) that converts externally input DC power into AC power suitable to drive the backlight assembly, and a fastening bracket for tightly fastening the inverter PCB. The power providing unit is fastened to the top-receiving container usually by means of screws.

In recent years, several attempts to reduce the weight of the LCD have been made. One among such attempts is to use aluminum (Al) or Al alloy as a material for forming the top-receiving container. However, this method makes it difficult to utilize screws in fastening a power providing unit to a liquid crystal panel. To overcome this problem, a double-sided adhesive tape or other like fastener has been used for attachment of a power providing unit. However, use of the adhesive tape undesirably results in an increase of a fastening error and makes accurate fastening of the power providing unit challenging.

Accordingly, there exists a need for a method of fastening a power providing unit to an LCD with accurate positioning while reducing the overall weight of the LCD through the use of aluminum as a material of a top-receiving container.

SUMMARY OF THE INVENTION

The present invention provides a light-weight display apparatus that can easily incorporate a power providing unit within an acceptable range of a fastening error.

According to one aspect, the present invention is a display apparatus including a display panel that displays an image, a backlight assembly that provides the display panel with light, a rear cover that is disposed under the backlight assembly, a top-receiving container combined with the rear cover, and a power providing unit that provides the backlight assembly with driving power. The guide unit protrudes from a surface of the rear cover by a predetermined height. The top-receiving container has an inner space to receive the display panel and the backlight assembly. The power providing unit is coupled to the rear cover at a position guided by the guide unit.

According to another aspect, the present invention is a display apparatus including a display panel, a backlight assembly that provides the display panel with light, a rear cover that is coupled to the backlight assembly, a top-receiving container that is combined with the rear cover to receive the display panel and the backlight assembly, and a power providing unit which provides the backlight assembly with driving power. The power providing unit is fastened to the rear cover with a fastener.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE INVENTION

Figure 1:
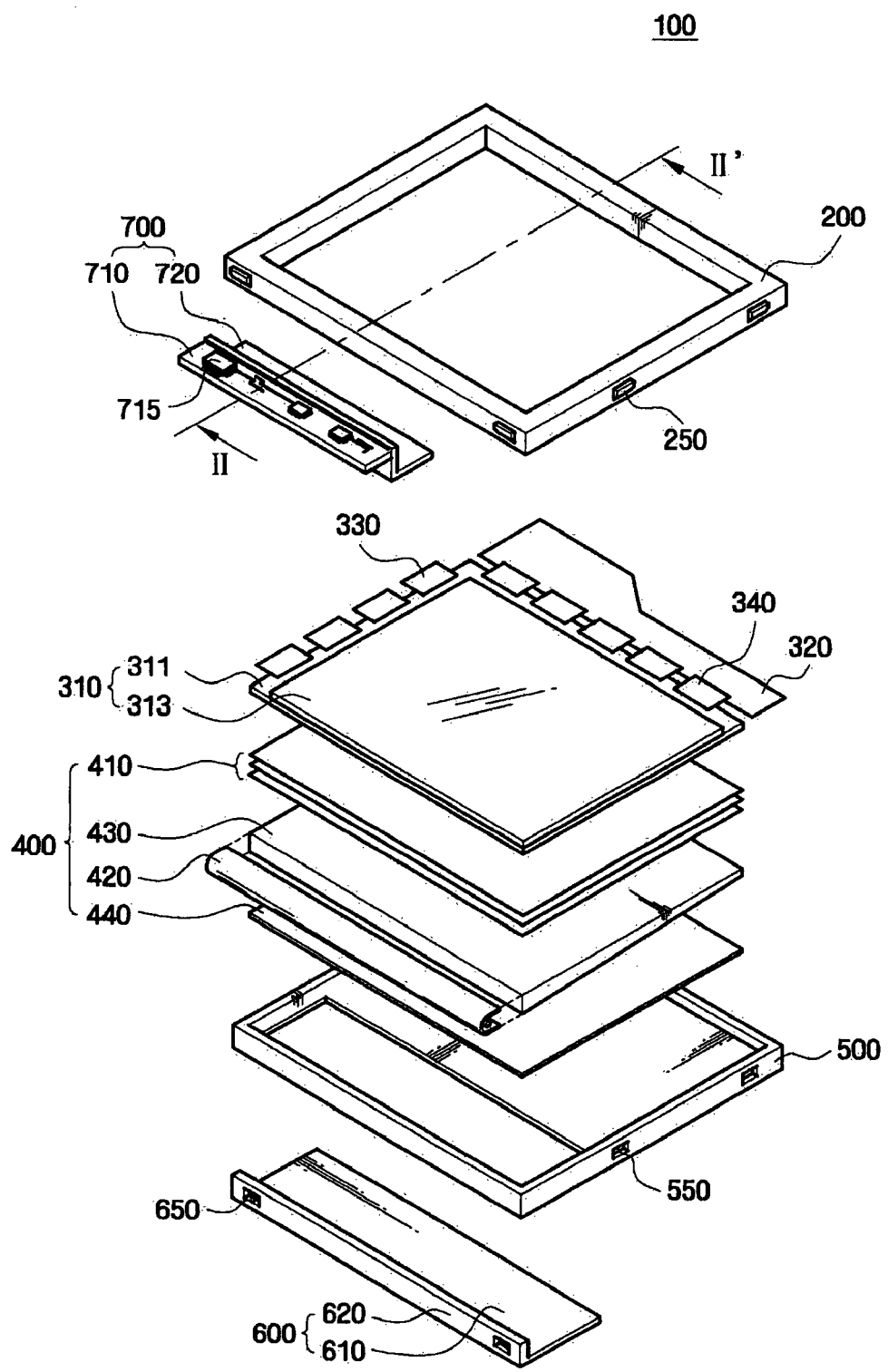
FIG. 1 is an exploded perspective view of a display apparatus according to a first embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Orientation-specific terms such as "upward," "downward," "below," "under," "bottom" and "top" are used herein in reference to the accompanying drawings.

A liquid crystal display (LCD), an electroluminescent display (ELD), a plasma display panel (PDP), and others can be used as a display apparatus used in the present invention. These display apparatuses are not limiting but illustrative. For convenience in explanation, the present invention will now be described by way of example with regard to a liquid crystal display (LCD) for use in a notebook computer.

The present invention is described hereinafter with reference to illustrations of a display apparatus according to embodiments of the invention.

Figure 2:
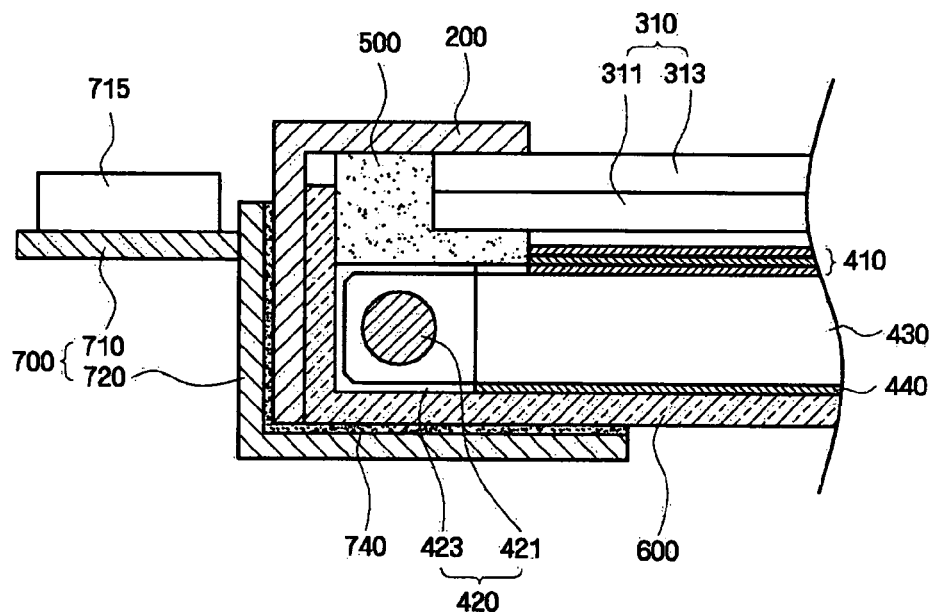
FIG. 2 is a cross-sectional view taken along line II~II' after components of the display apparatus of FIG. 1 are assembled.

FIG. 1 is an exploded perspective view of a display apparatus according to the first embodiment of the present invention, and FIG. 2 is a cross-sectional view taken along the line II-II' after components of the display apparatus of FIG. 1 are assembled.

Referring to FIGS. 1 and 2, the display apparatus 100 includes a display panel 310, a backlight assembly 400, a bottom-receiving container 500, a rear cover 600, a top-receiving container 200, and a power providing unit 700.

The display panel 310 displays an image and includes first and second substrates 311 and 313 and a liquid crystal layer (not shown) sandwiched between the first and second substrates 311 and 313.

The first substrate 311 includes a plurality of gate lines arranged at regular intervals in a first direction, a plurality of data lines arranged at regular intervals in a second direction perpendicularly to the plurality of gate lines, a plurality of pixel electrodes formed at pixel areas defined by the plurality of gate lines and the plurality of data lines in a matrix configuration, and a plurality of thin film transistors switched by signals applied to the gate lines. When turned on, the transistors transmit signals from the data lines to the respective pixel electrodes.

The second substrate 313 includes patterns of black matrix for blocking light from portions other than pixel areas, RGB color filter patterns producing colors, and a common electrode for realizing an image.

The first and second substrates 311 and 313 are spaced apart from each other by a spacer and bonded to each other by sealant or a glass frit.

A liquid crystal layer (not shown) having an anisotropic optical property is interposed between the first and second substrates 311 and 313. The liquid crystal layer contains liquid crystal molecules that change their alignment according to the electric field that is applied to the layer.

A printed circuit board (PCB) 320 is electrically connected to a side of the display panel 310 by a tape carrier package (TCP) 330, 340. The TCP 330, 340 has a driver IC for driving the display panel 310 at its center. The PCB 320 and the TCP 330, 340 apply driving signals and timing signals to the gate lines and data lines on the first substrate 311 in order to control the alignment angle of the liquid crystal molecules and the time at which liquid crystals are aligned.

The backlight assembly 400 is disposed under the display panel 310 and provides the display panel 310 with light.

The backlight assembly 400 includes a light source unit 420, a light guide plate 430, a reflective sheet 440, and one or more optical sheets 410.

The light source unit 420 is disposed along at least one side of the light guide plate 430 and includes a light source 421 and a light source cover 423 covering the light source 421. A linear light source such as a cold cathode fluorescent lamp (CCFL) or a hot cathode fluorescent lamp (HCFL) or a point light source such as a light emitting diode (LED) may be used as the light source 421. In the illustrative embodiment, CCFL is used as the light source.

The light guide plate 430 is situated adjacent to the light source unit 420, and guides the light emitted by the light source unit 420 toward the display panel 310. The light guide plate 430 is made of a highly refractive, transmissive material, e.g., polymethylmethacrylate (PMMA), polycarbonate (PC) or polyethylene (PE).

In addition, a light-scattering pattern is formed on a bottom surface of the light guide plate 430 to direct any light incident on the side of the light guide plate 430 toward the display panel. The light-scattering pattern may be formed by patterning a scattering material coated on the bottom surface of the light guide plate 430, curving the bottom surface of the light guiding plate 430, or using other methods.

The reflective sheet 440 is disposed below the light guide plate 430 and reflects light passing downward through the bottom surface of the light guide plate 430 back upward the light guide plate 430, thereby increasing the brightness of the backlight assembly 400 while allowing light to uniformly escape upward from the light guide plate 430.

The reflective sheet 440 may be made of a slim, highly elastic and reflective material. For example, the reflective sheet 440 may be a 0.01 to 5 mm thick polyethylene terephthalate (PET) sheet, although this is not a limitation of the invention. When necessary, the reflective sheet 440 may further be provided with a reflective layer coated on a thin, highly elastic material.

The optical sheets 410 are disposed above the light guide plate 430 and uniformly distribute the light guided by the light guide plate 430 toward the display panel 310. In some embodiments, the optical sheets 410 may be formed by selectively stacking one or more diffusion sheets, prism sheets, and protective sheets. Alternatively, the optical sheets 410 may be formed of only one optical sheet or a plurality of one type of optical sheet. The stacking order of the optical sheets 410 may vary within a range in which uniformity of light can be increased.

The optical sheets 410 may be formed of a transparent resin such as acrylic resin, polyurethane resin, or silicon resin.

Under the backlight assembly 400 having the aforementioned configuration is disposed the bottom-receiving container 500 receiving and supporting the components of the backlight assembly 400.

The bottom-receiving container 500 has a rectangular inner receiving space, and is made of an insulating synthetic resin. In addition, the inner space of the bottom-receiving container 500 has a supporting portion (not shown) on which the display panel 310 may be mounted. The bottom-receiving container 500 is combined with the rear cover 600 and may be modified in various types depending on the type in which the display panel 310 or the backlight assembly 400 is received.

The rear cover 600 is coupled to the bottom-receiving container 500 and supports the backlight assembly 400. Here, the rear cover 600 is comprised of a bottom surface 610, and a sidewall 620 bent vertically from an edge of the bottom surface 610. In addition, the bottom surface 610 of the rear cover 600 covers a receiving space of the bottom-receiving container 500, partially overlaps with the light source unit 420 and the light guide plate 430 being exposed outside by the bottom-receiving container 500, and supports them. The rear cover 600 may be made of a metal such as aluminum (Al) or Al alloy.

In addition, a guide unit (not shown) is formed and projects outwardly a predetermined height on the bottom surface 610 of the rear cover 600. Here, the guide unit guides the power providing unit 700 to combine with the rear cover 600. The guide unit of the rear cover 600 will later be described in detail with reference to FIGS. 3 and 4.

The top-receiving container 200 is combined with the rear cover 600 and the bottom-receiving container 500, and has an inner space to receive the display panel 310 and the backlight assembly 400. For example, the top-receiving container 200 may be made of a metal such as aluminum (Al) or Al alloy, and may be made of the same materials as the rear cover 600.

In some embodiments, the top-receiving container 200 may be combined with the rear cover 600 and the bottom-receiving container 500 through hook engagement. For example, hooks 250 may be provided along the outer surfaces of the top-receiving container 200 and hook insertion holes 550, 650 corresponding to the hooks 250 may be formed on the sidewalls of the bottom-receiving container 500 or the rear cover 600. Accordingly, the bottom-receiving container 500 and the rear cover 600 lift from the top-receiving container 200, so that the hooks 250, which are formed on the top-receiving container 200, are inserted into the hook insertion holes 550 and 650 of the bottom-receiving container 500 and the rear cover 600 to establish fastening of the top-receiving container 200 with the bottom-receiving container 500 and the rear cover 600. In addition, the fastening mechanism of the top-receiving container 200 with the bottom-receiving container 500 and the rear cover 600 may be modified in various ways using known methods.

The power providing unit 700 is combined with the top-receiving container 200 and the rear cover 600, and is comprised of an inverter printed circuit board 710, and a fastening bracket 720 to securely support the inverter printed circuit board 710, and so on.

The inverter printed circuit board 710, on which an electronic device 715 is mounted, converts externally applied direct-current (DC) power into alternating-current (AC) power, and lights a light source 421 of the backlight assembly 400 boosting the alternating-current (AC) voltage to several hundreds of volts (V). In addition, the inverter printed circuit board 710 may be combined with the fastening bracket 720 by a fastening member. Here, usable examples of fastening member include a bolt, a latch, or other like fasteners.

The fastening bracket 720 has an L-shaped cross section, and the inverter printed circuit board 710 is fixedly fastened therewith. The fastening bracket 720 may be formed of a chassis made of a metal or the same material as either the top-receiving container 200 or the rear cover 600. Here, since the fastening bracket 720 is in direct contact with the top-receiving container 200, the fastening bracket 720 may present a sufficient grounding effect without a separately provided grounding means.

In addition, the fastening bracket 720 is combined with a sidewall of the top-receiving container 200 and the bottom surface 610 of the rear cover 600. Here, a double-sided adhesive tape 740 is attached between the fastening bracket 720 and the top-receiving container 200 or between the fastening bracket 720 and the rear cover 600. The fastening bracket 720 and the top-receiving container 200 as well as the fastening bracket 720 and the rear cover 600 are combined with each other by the double-sided adhesive tape 740.

In addition, the fastening bracket 720 is combined with the rear cover 600. That is, the fastening bracket 720 is guided by the guide unit formed on the bottom surface 610 of the rear cover 600 and is fastened with the rear cover 600. The guide unit prevents fluctuation of the power providing unit 700 combined with the rear cover 600, thereby reducing a fastening error.

The fastening mechanism of the rear cover 600 and the power providing unit 700 will now be described in more detail with reference to FIGS. 3 through 5.

Figure 3:
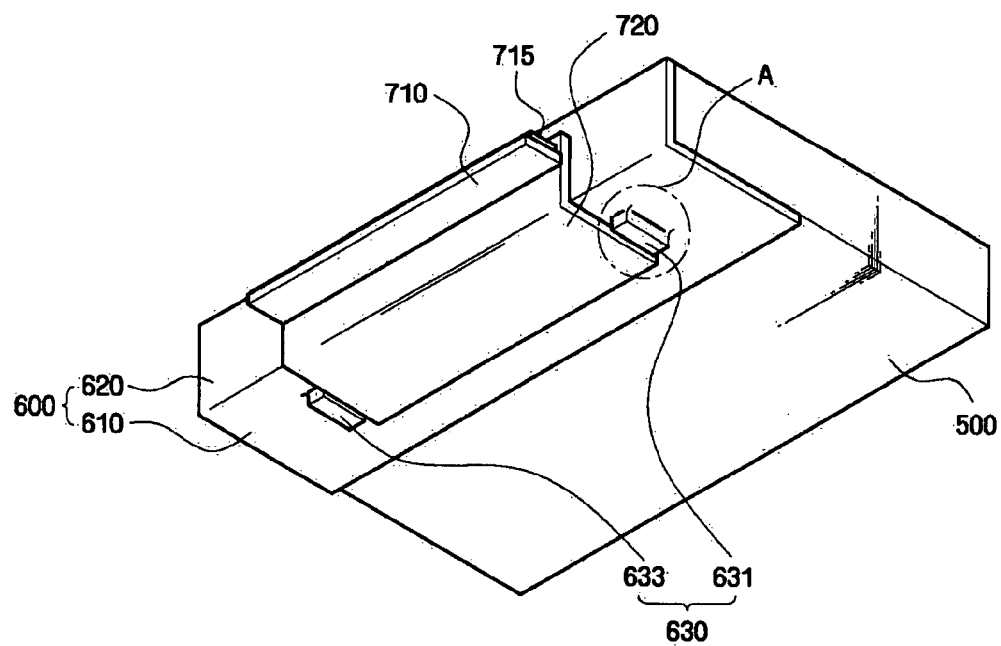
FIG. 3 is a bottom perspective view after components of the display apparatus of FIG. 1 are assembled.
Figure 4:
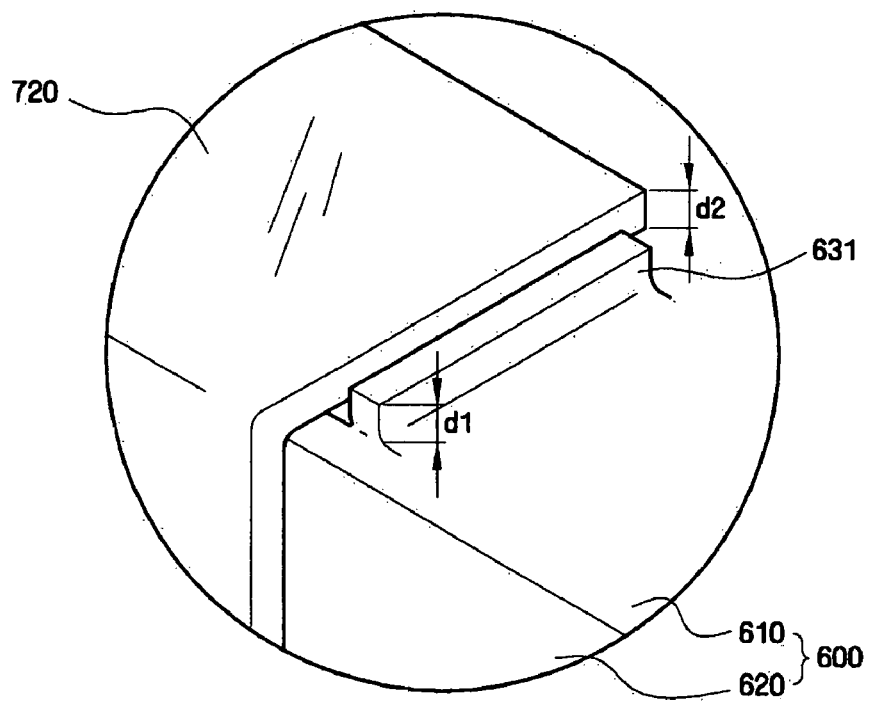
FIG. 4 is an enlarged view of the portion A of FIG. 3.
Figure 5:
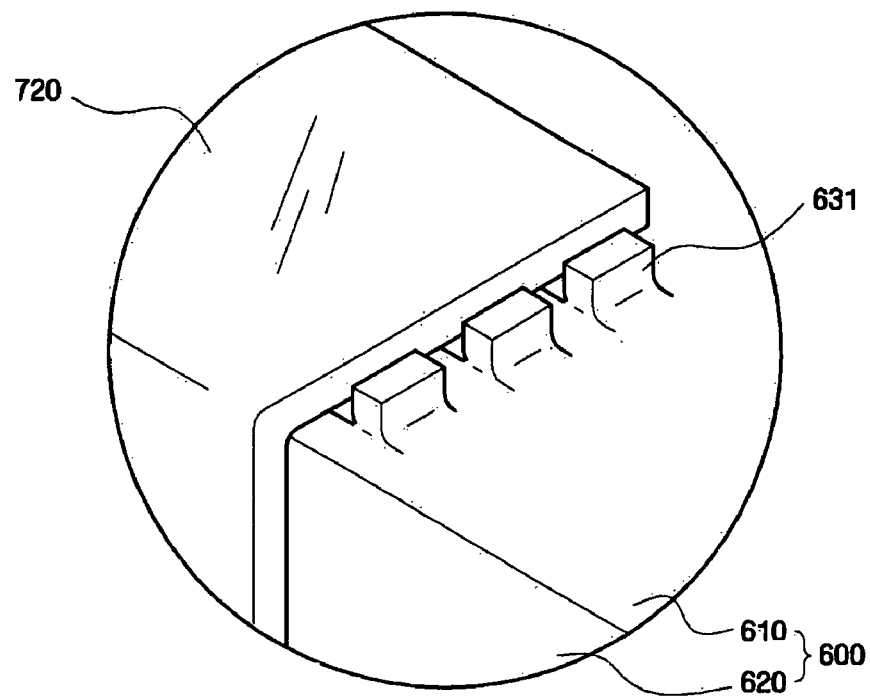
FIG. 5 is a view illustrating an alternative embodiment of the portion A of FIG. 3.

FIG. 3 is a bottom perspective view after components of the display apparatus of FIG. 1 are assembled, FIG. 4 is an enlarged view of the portion A shown in FIG. 3, and FIG. 5 is a view illustrating an alternative embodiment of the portion A shown in FIG. 3.

Referring to FIGS. 3 through 5, the fastening bracket 720 of the power providing unit 700 is combined with the rear cover 600, and a guide unit 630 is fastened with and guided by the rear cover 600.

In greater detail, the fastening bracket 720 has an L-shaped cross section and is attached to the bottom surface 610 of the rear cover 600 by a double-sided adhesive tape. The guide unit 630 projects from the bottom surface 610 of the rear cover 600 by a predetermined height (d1). The guide unit 630 guides a combination between the power providing unit 700 and the rear cover 600. Preferably, the predetermined height d1 of the guide unit 630 is substantially the same as or greater than a thickness d2 of the fastening bracket 720 of the power providing unit 700.

In addition, the guide unit 630 may be formed after a predetermined region of the bottom surface 610 of the rear cover 600 is cut and bent in a direction away from where the display panel 310 would be. The guide unit 630 may be formed on the bottom surface 610 of the rear cover 600 adjacent to either side of the power providing unit 700. In other words, the guide unit 630 includes a first guide portion 631 and a second guide portion 633 formed on the bottom surface 610 of the rear cover 600 adjacent to different (e.g., opposite) sides of the fastening bracket 720. In the particular embodiment shown, the first and second guide portions 631 and 633 are positioned along opposite ends of the power providing unit 700.

In an alternative embodiment, a plurality of first guide portions and a plurality of second guide portions may be provided at opposite sides of the fastening bracket 720, as shown in FIG. 5.

As described above, the guide unit 630 of the rear cover 600 prevents deviation in the alignment of the power providing unit 700 with the rear cover 600. Accordingly, a fastening error between the rear cover 600 and the power providing unit 700 can be reduced to ±0.5 mm or less.

Now, a display apparatus according to a second embodiment of the present invention will be described in more detail with reference to FIGS. 6 through 8. For brevity, the elements having the same functions as those shown in FIGS. 1 through 5 are denoted by the same reference numerals and their detailed description is omitted.

Figure 6:
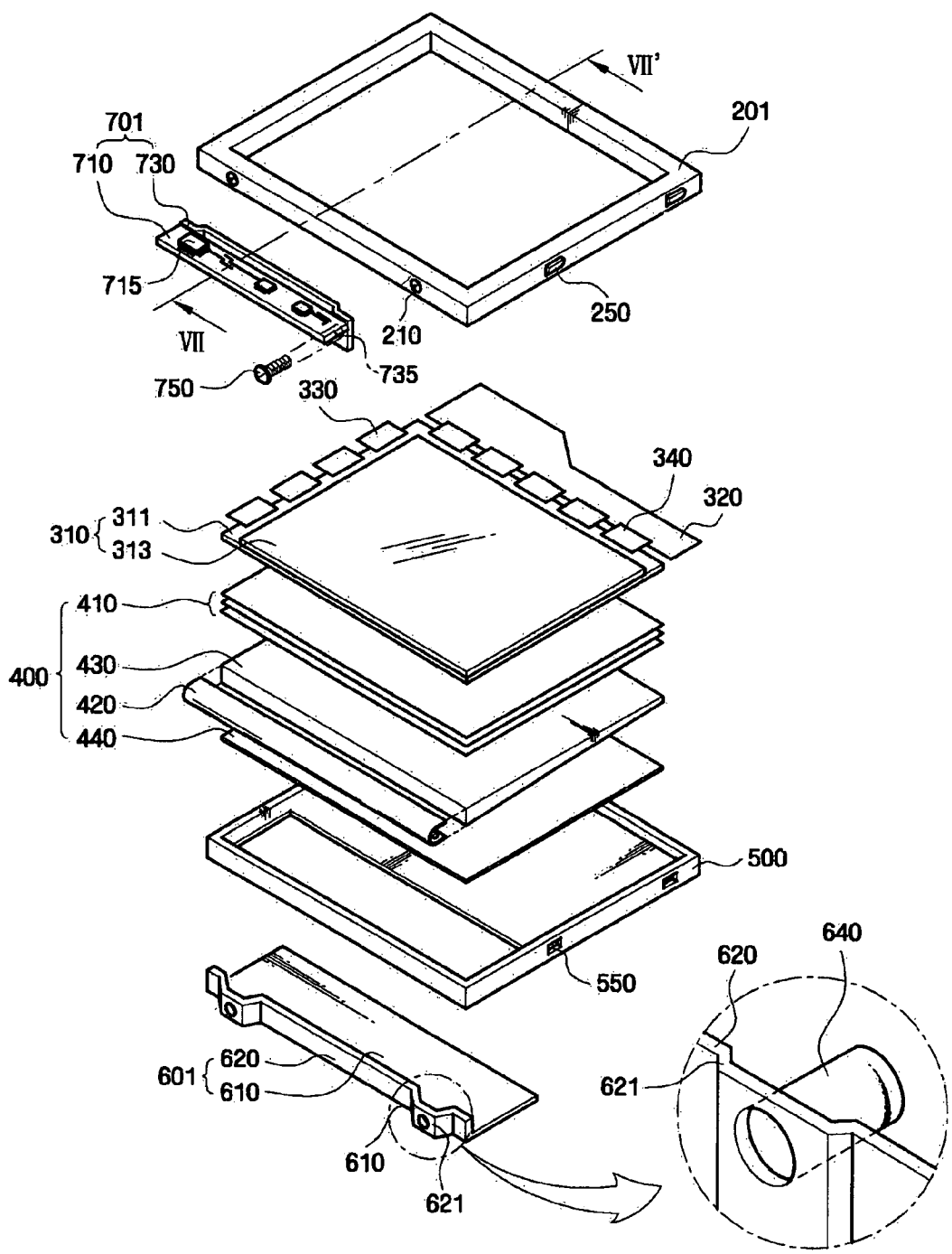
FIG. 6 is an exploded perspective view of a display apparatus according to a second embodiment of the present invention.
Figure 7:
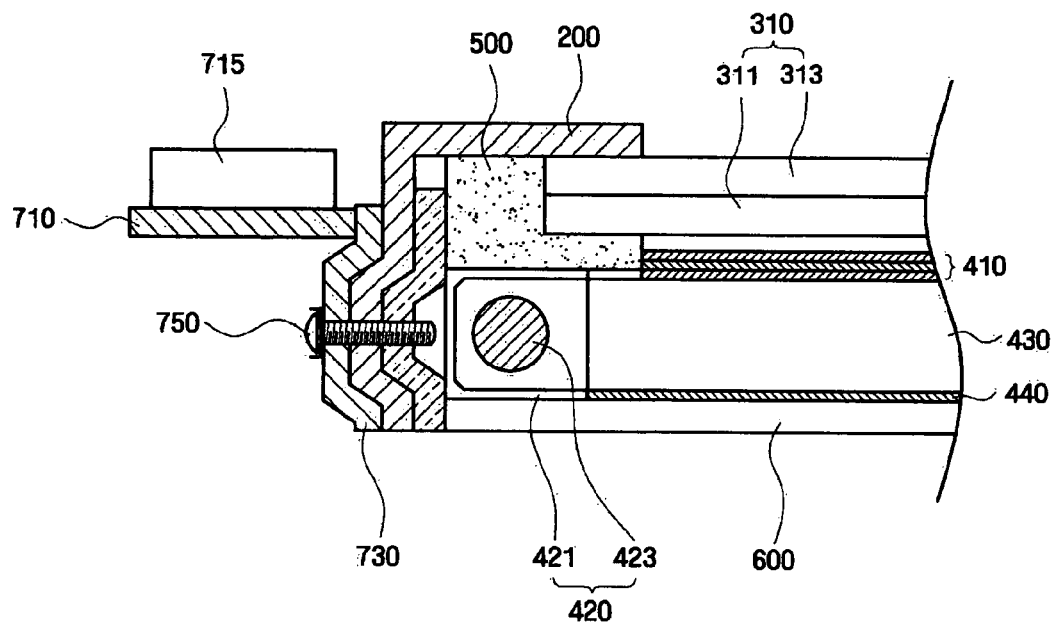
FIG. 7 is a cross-sectional view taken along the line VII-VII' after components of the display apparatus of FIG. 6 are assembled.

FIG. 6 is an exploded perspective view of a display apparatus 110 according to the second embodiment of the present invention, and FIG. 7 is a cross-sectional view taken along the line VII-VII' after components of the display apparatus 110 of FIG. 6 are assembled.

Referring to FIGS. 6 through 7, the display apparatus 110 includes the display panel 310, the backlight assembly 400, the bottom-receiving container 500, a rear cover 601, a top-receiving container 201 and a power providing unit 701.

As described above, the display panel 310 includes first and second substrates 311, 313 and a liquid crystal layer (not shown) having an anisotropic optical property interposed between the first and second substrates 311, 313, and displays an image.

A printed circuit board (PCB) 320 is electrically connected to either side of the display panel 310 by a tape carrier package (TCP) 330, 340. The PCB 320 and the TCP 330, 340 apply driving signals and timing signals to the gate lines and data lines on the first substrate 311 in order to control the alignment angle of the liquid crystal molecules and the time at which liquid crystals are aligned.

The backlight assembly 400 is disposed below the display panel 310 and provides the display panel 310 with light. The backlight assembly 400 includes the light source unit 420, the light guide plate 430, the reflective sheet 440, and one or more optical sheets 410.

Under the backlight assembly 400 having the aforementioned configuration is disposed the bottom-receiving container 500 receiving and supporting components of the backlight assembly 400.

The bottom-receiving container 500 has a rectangular inner receiving space, and is made of an insulating synthetic resin. In addition, the inner space of the bottom-receiving container 500 has a supporting portion (not shown) on which the display panel 310 may be mounted. The bottom-receiving container 500 is combined with a rear cover 601 and may be modified in various ways depending on how the display panel 310 or the backlight assembly 400 is received.

The rear cover 601 is combined with the bottom-receiving container 500 and supports the backlight assembly 400. The rear cover 601 has a bottom surface 610 and a sidewall 620 bent vertically from either edge of the bottom surface 610. Here, the bottom surface 610 of the rear cover 601, which covers the receiving space of the bottom-receiving container 500, partially overlaps with the light source unit 420 and the light guide plate 430 exposed outside by the bottom-receiving container 500, and supports them.

The sidewall 620 of the rear cover 601 includes a projecting portion 621 projecting outwardly at one or more predetermined positions, the projecting portion 621 having a screw fastener 640 formed at the interior portion thereof. In more detail, each of the sidewall 620 of the rear cover 601 is formed such that the predetermined portion of the sidewall 620 projects outwardly from the rear cover 601. The screw fastener 640 is formed on an inward portion of the projecting portion 621. The projecting portion 621 is formed on the sidewall 620 of the rear cover 601 such that the power providing unit 701 is positioned between them when the apparatus is assembled.

The screw fastener 640 is formed in a cylindrical shape by burring, and has a threaded (not shown) inner wall. The screw fastener 640 is screw-fastened with the power providing unit 701 to couple the rear cover 601 to the power providing unit 701.

Here, the rear cover 601 may be made of a metal, e.g., steel use stainless (SUS).

The top-receiving container 201 is combined with the rear cover 601 and the bottom-receiving container 500, and has an inner space to receive the display panel 310 and the backlight assembly 400.

Here, one sidewall of the top-receiving container 201 combined with the sidewall 620 of the rear cover 601 is bent along a projecting portion 621 formed on the sidewall 620 of the rear cover 601 and has a throughhole 210 corresponding to the screw fastener 640. The top-receiving container 201 may be made of a material such as aluminum (Al) or Al alloy.

The top-receiving container 201 may be combined with the bottom-receiving container 500 through a hook engagement.

The power providing unit 701 is located adjacent to one sidewall of the top-receiving container 201, that is, the sidewall of the top-receiving container 201 where the throughhole 210 is formed, and is screw-fastened with the rear cover 601.

Here, the power providing unit 701 includes a connection hole 735 corresponding to the screw fastener 640 of the rear cover 601. In more detail, the power providing unit 701 includes an inverter printed circuit board 710 supplying the backlight assembly 400 with driving power, and a fastening bracket 730 supporting and fixing the inverter circuit board 710.

The inverter printed circuit board 710, on which a predetermined electronic device 715 is mounted, converts externally applied direct-current (DC) power into alternating-current (AC) power, and lights a light source 421 of the backlight assembly 400 boosting the alternating-current (AC) voltage to several hundreds of volts (V). In addition, the inverter printed circuit board 710 may be combined with the fastening bracket 730 by a predetermined fastening member. Examples of the predetermined fastening member include a bolt, a latch, or other like fasteners.

The fastening bracket 730 has a plate-shaped structure, and the inverter printed circuit board 710 is fixedly fastened therewith. In other words, one surface of the fastening bracket 730 is combined with the inverter printed circuit board 710 and the other surface of the fastening bracket 730 is combined with the rear cover 601. The fastening bracket 730 is bent along the projecting portion 621 of the rear cover 601. In the fastening bracket 730 is also formed the connection hole 735 corresponding to the screw fastener 640 of the rear cover 601. Thus, the fastening bracket 730 is combined with the rear cover 601 by means of an external fastening member, e.g., a screw 750. In this case, the screw 750 is inserted into the throughhole 210 of the top-receiving container 201 from the connection hole 735 of the fastening bracket 730, and then screw-fastened with the screw fastener 640 of the rear cover 601.

The sidewall of the fastening bracket 730 is preferably bent in a manner corresponding to the projecting portion 621 of the rear cover 601.

Now, the fastening mechanism of the rear cover 601 and the power providing unit 701 will be described in more detail with reference to FIG. 8.

Figure 8:
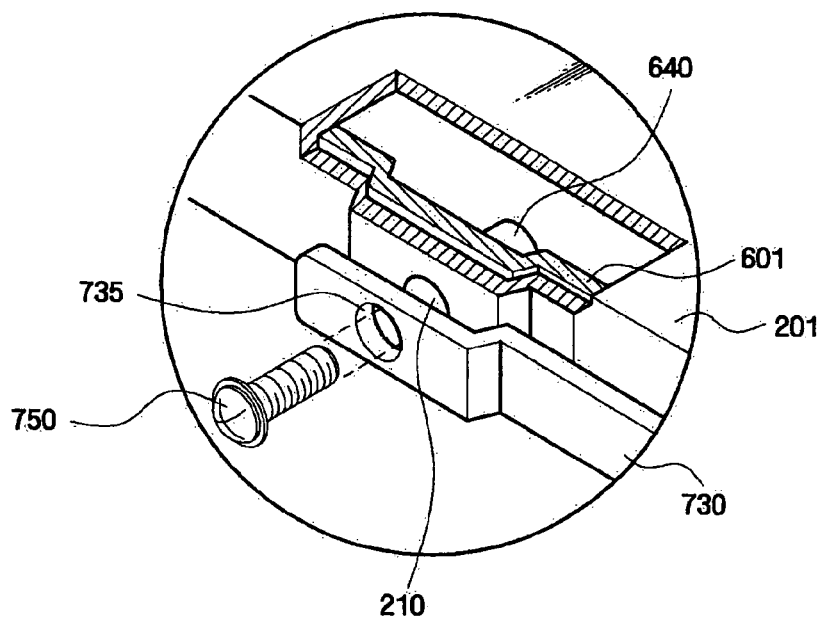
FIG. 8 is a partly exploded sectional view illustrating a fastened portion between a power providing unit and a rear cover shown in FIG. 6.

FIG. 8 is a partly exploded sectional view illustrating a fastened portion between a power providing unit and a rear cover shown in FIG. 6.

Referring to FIG. 8, the fastening bracket 730 of the power providing unit 701 is screw-fastened with the rear cover 601. In more detail, the rear cover 601 includes the projecting portion 621 projecting outwardly at the predetermined portion of the sidewall 620, the projecting portion 621 having the screw fastener 640 formed thereon. Here, the projecting portion 621 formed on the sidewall 620 of the rear cover 601 preferably projects outwardly by a distance corresponding to the length of the screw fastener 640.

The top-receiving container 201 is combined with the rear cover 601, and one sidewall of the top-receiving container 201 combined with the sidewall 620 of the rear cover 601 is bent to accommodate or fit with the projecting portion 621. The sidewall of the top-receiving container 201 has the throughhole 210 corresponding to the screw fastener 640.

The power providing unit 701 is located adjacent to one sidewall of the top-receiving container 201, that is, the sidewall of the top-receiving container 201 where the throughhole 210 is formed, and is screw-fastened with the rear cover 601. Here, the sidewall of the fastening bracket 730 of the power providing unit 701 is preferably bent to correspond to the projecting portion 621 of the rear cover 601. In the fastening bracket 730 is also formed a connection hole 735 corresponding to the screw fastener 640.

Therefore, the power providing unit 701 is engaged with the screw fastener 640 of the rear cover 601 such that the screw 750 is inserted into the throughhole 210 of the top-receiving container 201 from the connection hole 735 of the fastening bracket 730. An inner wall of the screw fastener 640 is threaded, thereby allowing the screw 750 to securely fasten the power providing unit 701.

As described above, the display apparatus of the present invention according to the present invention provides at least the following advantages.

First, the use of a double-sided adhesive tape enables easy attachment of the power providing unit within an acceptable fastening-error range.

Second, since a top-receiving container made of aluminum, which is a lightweight material, is used in fastening the power providing unit to the display apparatus by screw fastening, the overall weight of an LCD module can be reduced.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A display apparatus comprising:
a display panel that displays an image;
a backlight assembly that provides the display panel with light;
a rear cover that is coupled to the backlight assembly and has a guide unit formed thereon, wherein the guide unit protrudes from a surface of the rear cover by a predetermined height;
a top-receiving container having an inner space to receive the display panel and the backlight assembly, the top-receiving container being combined with the rear cover; and
a power providing unit providing the backlight assembly with driving power, the power providing unit being coupled to the rear cover at a position guided by the guide unit,
wherein the power providing unit comprises a printed circuit board and a fastening bracket having an L-shaped cross section that is combined with the top-receiving container and the rear cover and supports the printed circuit board, wherein the fastening bracket includes a first plate and a second plate that is perpendicular to the first plate, the first plate being disposed between the printed circuit board and at least one of the top-receiving container and the rear cover.

2. The display apparatus of claim 1, wherein the guide unit protrudes from a bottom surface of the rear cover.

3. The display apparatus of claim 1, wherein the guide unit protrudes from a side surface of the rear cover.

4. The display apparatus of claim 1, wherein the guide unit comprises:
a first guide portion formed adjacent to a first side of the fastening bracket; and
a second guide portion formed adjacent to a second side of the fastening bracket that is opposite to the first side portion of the fastening bracket.

5. The display apparatus of claim 1, wherein the guide unit has a height that is substantially the same as the thickness of the fastening bracket.

6. The display apparatus of claim 1, wherein the guide unit is formed by cutting and bending a predetermined region of the rear cover.

7. The display apparatus of claim 1, wherein the power providing unit is fastened to the rear cover and the top-receiving container by a double-sided adhesive tape.

8. The display apparatus of claim 1, wherein the backlight assembly comprises:
a lamp;
a light guide plate situated adjacent to one side of the lamp and uniformly guiding the light emitted by the lamp toward the display panel; and
a reflective sheet reflecting light traveling away from the display panel through the bottom surface of the light guide plate back toward the display panel, wherein the rear cover covers predetermined portions of the lamp and the light guide plate.

9. The display apparatus of claim 1, wherein the rear cover and the top-receiving container are fastened with each other with a hook mechanism.

10. The display apparatus of claim 1, further comprising a bottom-receiving container disposed between the backlight assembly and the rear cover and receiving the backlight assembly.

11. The display apparatus of claim 1, wherein the fastening bracket is guided by the guide unit and fastened to the rear cover.

12. The display apparatus of claim 11, wherein a sidewall portion of the top-receiving container is disposed between the first plate and the rear cover.

13. A display apparatus comprising:
a display panel that displays an image;
a backlight assembly that provides the display panel with light;
a rear cover coupled to the backlight;
a top-receiving container having an inner space to receive the display panel and the backlight assembly, the top-receiving container being combined with the rear cover; and
a power providing unit providing the backlight assembly with driving power, the power providing unit comprising a printed circuit board and a fastening bracket that is coupled with the top-receiving container and the rear cover and supports the printed circuit board, the fastening bracket including a first plate and a second plate connected to the first plate, the first plate being parallel to a sidewall of the top-receiving container, the second plate being parallel to a bottom surface of the rear cover, wherein the first plate contacts the sidewall of the top-receiving container.

14. The display apparatus of claim 13, wherein the second plate contacts the bottom surface of the rear cover.

15. The display apparatus of claim 13, wherein a sidewall portion of the top-receiving container is disposed between the first plate and the rear cover.

16. A display apparatus comprising:
a display panel that displays an image;
a backlight assembly that provides the display panel with light;
a rear cover coupled to the backlight;
a top-receiving container having an inner space to receive the display panel and the backlight assembly, the top-receiving container being combined with the rear cover; and
a power providing unit providing the backlight assembly with driving power, the power providing unit comprising a printed circuit board and a fastening bracket that is coupled with the top-receiving container and the rear cover and supports the printed circuit board, the fastening bracket including a first plate, wherein a sidewall portion of the top-receiving container is disposed between the first plate and a sidewall of the rear cover.

17. The display apparatus of claim 16, wherein the fastening bracket further includes a second plate connected to the first plate and contacting a bottom surface of the sidewall portion of the top-receiving container.

18. The display apparatus of claim 16, wherein the first plate is attached to the sidewall portion of the top-receiving container.

* * * * *